(12) United States Patent
Chernyshov et al.

(10) Patent No.: US 8,787,124 B1
(45) Date of Patent: Jul. 22, 2014

(54) SYSTEMS AND METHODS FOR EXTRACTING CURIE TEMPERATURE DISTRIBUTION IN HEAT ASSISTED MAGNETIC RECORDING MEDIA

(71) Applicant: WD Media, LLC, San Jose, CA (US)

(72) Inventors: Alexander S. Chernyshov, San Jose, CA (US); Thanh V. Le, San Jose, CA (US); David Treves, Palo Alto, CA (US); Antony Ajan, Santa Clara, CA (US); B. Ramamurthy Acharya, Fremont, CA (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 14/101,671

(22) Filed: Dec. 10, 2013

Related U.S. Application Data

(60) Provisional application No. 61/859,930, filed on Jul. 30, 2013.

(51) Int. Cl.
*G11B 11/00* (2006.01)
(52) U.S. Cl.
USPC ................................. 369/13.24; 369/53.22
(58) Field of Classification Search
None
See application file for complete search history.

(56) References Cited

U.S. PATENT DOCUMENTS

| | | |
|---|---|---|
| 2008/0043359 A1 | 2/2008 | Chung et al. |
| 2012/0232831 A1 | 9/2012 | Mizuno et al. |
| 2014/0043707 A1* | 2/2014 | Tomikawa et al. ............... 360/31 |

OTHER PUBLICATIONS

A. Chernyshov, et al., "Measurement of Magnetic Properites Relevant to Heat Assisted Magnetic Recording", IEEE on Magnetics (2013), presented on the Joint Intermag-MMM conf. (Chicago, Jan. 2013), pp. 1-4.

* cited by examiner

*Primary Examiner* — Paul Huber

(57) ABSTRACT

Systems and methods for extracting a Curie temperature distribution in a heat assisted magnetic recording medium are provided. One such method involves saturating a magnetic recording medium by causing a laser to direct light on the medium and causing a magnet adjacent to the medium to generate a magnetic field on the medium, causing the magnet to remove the magnetic field on the medium, writing to the medium by causing the laser to direct light on the medium, recording measurements of light reflected from the medium made by a light detector, converting the measurements of reflected light into measurements of remanent thermal magnetization, and extracting the Curie temperature distribution from the measurements of remanent thermal magnetization. One such system involves a processor coupled to a spindle, a magnet, a laser, and a light detector, where the processor is configured to perform this method.

16 Claims, 6 Drawing Sheets

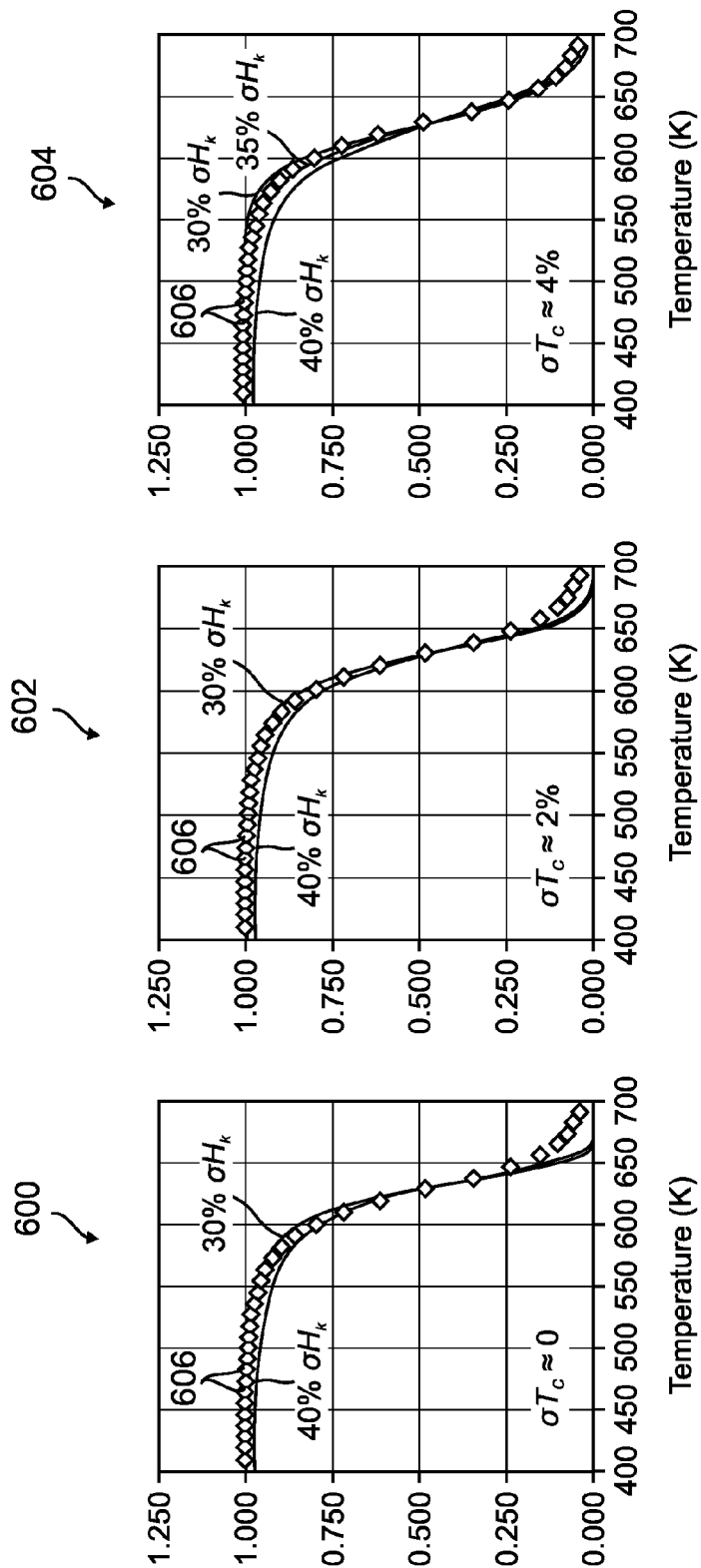

SYSTEMS AND METHODS FOR EXTRACTING CURIE TEMPERATURE DISTRIBUTION IN HEAT ASSISTED MAGNETIC RECORDING MEDIA

CROSS-REFERENCE TO RELATED APPLICATION(S)

This application claims priority to and the benefit of U.S. Provisional Application No. 61/859,930, filed on Jul. 30, 2013, and entitled, "SYSTEMS AND METHODS FOR EXTRACTING CURIE TEMPERATURE DISTRIBUTION IN HEAT ASSISTED MAGNETIC RECORDING MEDIA", the entire content of which is incorporated herein by reference.

FIELD

The present invention relates generally to magnetic recording media, and more specifically to systems and methods for extracting Curie temperature distribution in heat assisted magnetic recording (HAMR) media.

BACKGROUND

To achieve magnetic recording densities beyond 1 Terabit per inch squared or Tb/in2, smaller grain size (e.g., less than 6 nanometers or nm) media may be required. These increased magnetic recording densities can demand higher Ku materials for the recording layer to sustain thermal stability, such as L10 ordered FePt alloys. Due to high anisotropy, FePt media is generally not writable with conventional recording heads. Therefore, either exchange coupled composite media structures or heat assisted magnetic recording (HAMR) is needed. HAMR writing occurs near the Curie temperature (Tc) and Tc distribution (σTc) will generally have strong effect on recording performance. However, measuring Tc distribution (σTc) remains a significant challenge in the industry.

BRIEF DESCRIPTION OF THE DRAWINGS

FIGS. 6a, 6b, 6c are graphs of normalized remanent magnetic moment versus temperature for data obtained from a testing system configured to extract Curie temperature distribution with multiple curves fitted to the data in accordance with one embodiment of the invention.

DETAILED DESCRIPTION

Figure 1:
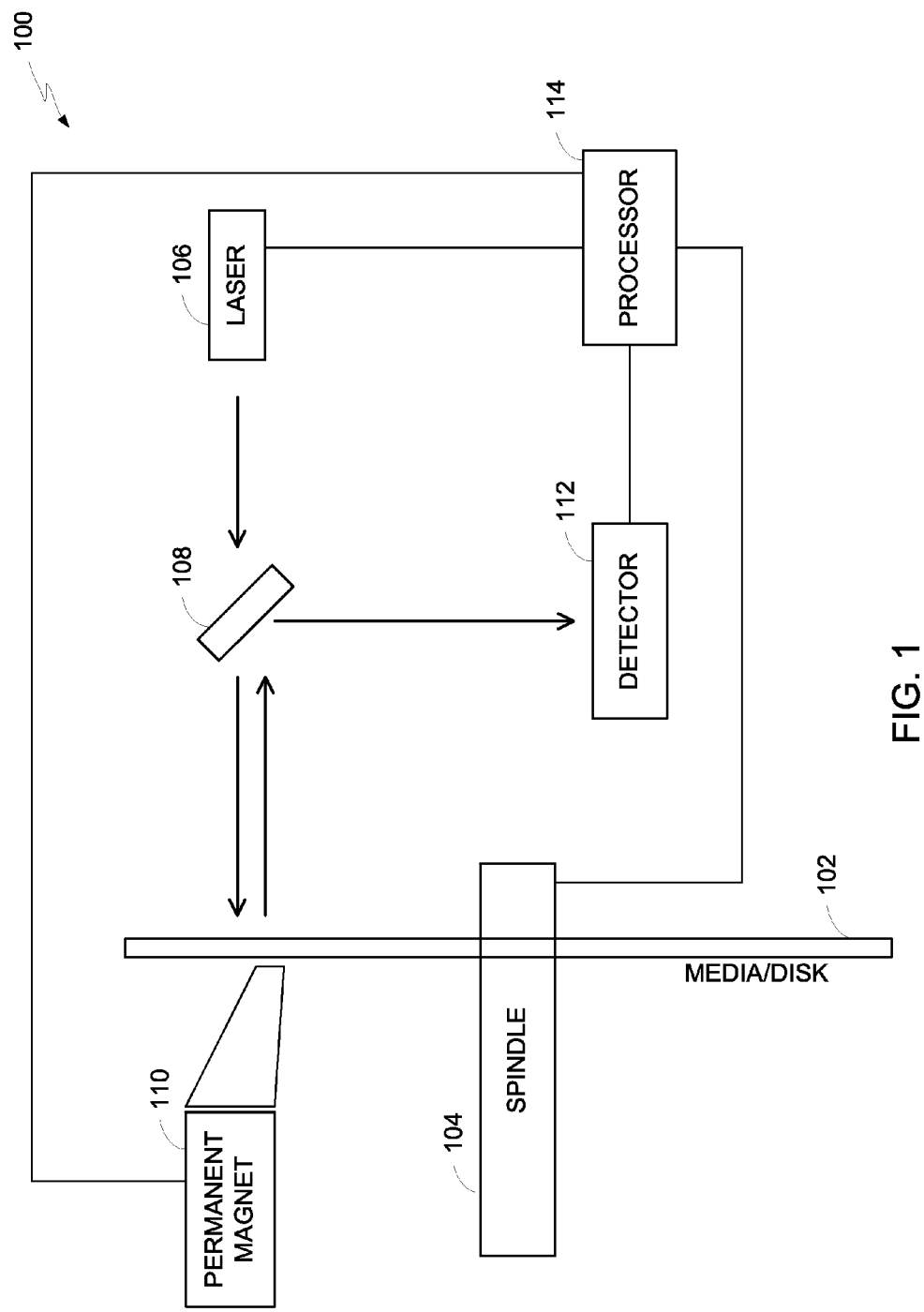
FIG. 1 is a top schematic view of a Curie temperature testing system configured to extract Curie temperature distribution on disks/media configured for heat assisted magnetic recording (HAMR) in accordance with one embodiment of the invention.

Referring now to the drawings, embodiments of systems and methods for extracting a Curie temperature distribution on a disk/media configured for heat assisted magnetic recording (HAMR) are illustrated. One such embodiment involves a method and a prototype model/system to extract Tc distribution (σTc) from experimentally measured (laser heating) remanent thermal demagnetization curves (e.g., thermal erasures curves). More specifically, the remanent thermal demagnetization curves are fitted and considered with respect to Hk (e.g., anisotropy field) and Tc distributions. Both the Hk and Tc distributions can be extracted based on a best fit to the remanent thermal demagnetization curves. Similar aspects of the methods and systems provided herein are described in an article entitled, "MEASUREMENT OF MAGNETIC PROPERTIES RELEVANT TO HEAT-ASSISTED-MAGNETIC-RECORDING", presented by the instant inventors at the 12th Joint MMM/Inter-mag Conference, IEEE on Magnetics, of Jan. 14-18, 2013, the entire content of which is hereby incorporated by reference.

In more detail, one embodiment involves a system including a magnetic recording medium, a spindle configured to rotate the medium, a magnet adjacent to the medium and configured to generate a magnetic field, a laser configured to direct light on the medium, a light detector configured to detect light reflected from the medium, and a processor coupled to the spindle, the magnet, the laser, and the light detector. In such case, the processor is configured to saturate the medium by causing the laser to direct light on the medium and causing the magnet to generate a magnetic field on the medium, cause the magnet to remove the magnetic field on the medium, write to the medium by causing the laser to direct light on the medium, record measurements of light reflected from the medium made by the light detector, convert the measurements of reflected light into measurements of remanent thermal magnetization, and extract the Curie temperature distribution from the measurements of remanent thermal magnetization.

In some embodiments, a method for extracting a Curie temperature distribution on a disk/media configured for HAMR involves saturating a magnetic recording medium by causing a laser to direct light on the medium and causing a magnet adjacent to the medium to generate a magnetic field on the medium, causing the magnet to remove the magnetic field on the medium, writing to the medium by causing the laser to direct light on the medium, recording measurements of light reflected from the medium made by a light detector, converting the measurements of reflected light into measurements of remanent thermal magnetization, and extracting the Curie temperature distribution from the measurements of remanent thermal magnetization.

Figure 2:
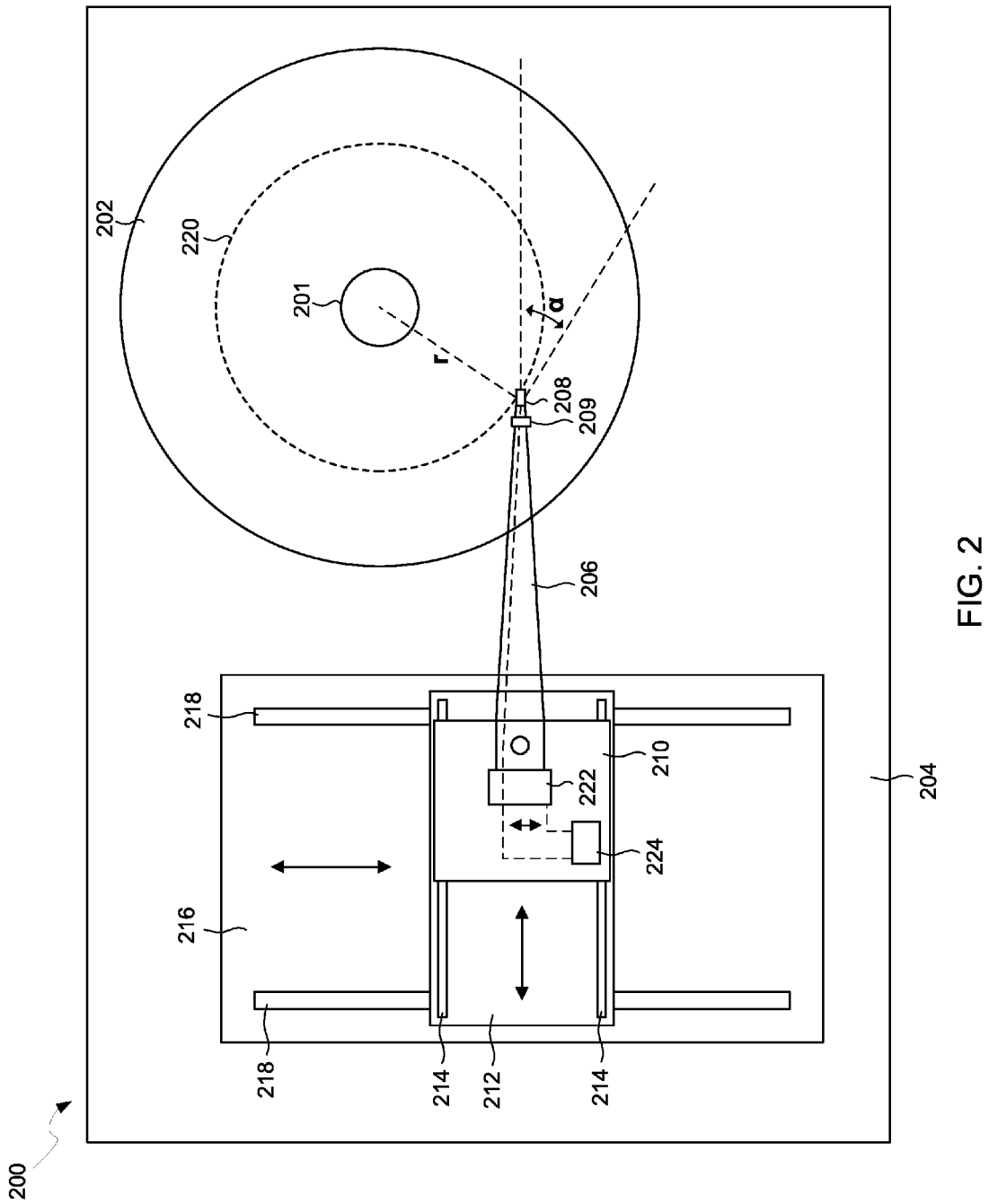
FIG. 2 is a top schematic view of a spin stand having a spindle that can be used in a testing system configured to extract Curie temperature distribution from disks/media configured for heat assisted magnetic recording (HAMR) in accordance with one embodiment of the invention.

FIG. 1 is a top schematic view of a Curie temperature testing system 100 configured to extract Curie temperature distribution on disks/media 102 configured for heat assisted magnetic recording (HAMR) in accordance with one embodiment of the invention. The testing system 100 includes a spindle 104 of a spin stand, the media disk 102, a laser 106, a beam splitter 108, a permanent magnet 110, a detector 112, and a processor 114. The processor 114 is coupled to the laser 106, the spindle 102, the permanent magnet 110, and the detector 112. In other embodiments, the processor 114 can be coupled to other components according to the particular application. In some embodiments, the permanent magnet 110 is a component of the spin stand of the spindle 102. In the embodiment of FIG. 2, the system 100 includes the spindle 102 of a spin stand. In other embodiments, the system can include more components of the spin stand, and/or the entire spin stand.

The testing system 100 is configured such that the laser 106 emits light impinging on the beam splitter 108. All or a portion of the light impinging on the beam splitter 108 travels through the beam splitter 108 to a spot on the media 102 (e.g., to heat the media 102). Some light is reflected from the media 102 and impinges on the beam splitter 108 which reflects such light to the light/optical detector 112 in a direction substantially perpendicular to a direction of the light reflected from the media 102. In embodiments where only a portion of the light impinging on the beam splitter 108 from the laser 106 travels through the beam splitter 108, the remaining portion of such light can be directed to the detector 112, such that real time measurements of laser output can be measured, and possibly correlated with a temperature of the media 102.

In operation, the processor 114 can control the laser 106 and permanent magnet 110 to effectively write all of the grains of the recording layer in the media 102 to a preselected magnetized level (e.g., saturation). The processor 114 then can control the same components to effectively erase (e.g., by writing with high laser power) all of the grains of the recording layer of the media 102. After the erasure, the processor 114 can store measurements of reflected light (e.g., where the light will be converted into measurements of relative magnetic moment) taken by the detector 112. The processor 114 can repeat the saturation and erasure steps to ensure the media is fully thermally demagnetized. In many embodiments, the media 102 is cooled after writing. In several embodiments, the light measurements taken from the detector 112 can be processed to extract the Tc distribution. In some embodiments, the processor 114 can focus on and extract Tc distribution from different recording layers within the media 102.

In one embodiment, the laser 106 is a high stability laser diode capable of supplying sufficient heat for thermo-magnetic writing. In several embodiments, the system and particularly the detector are configured to measure the magnetization of the media using the perpendicular magneto-optic (MO) Kerr effect. In some embodiments, the laser spot size on the media has a full width half maximum (FWHM) of about 2.5 micro-meters. In one embodiment, a large foot print of the magnetic field or H is provided to ensure that the refreezing of magnetization or M occurs under a relatively constant field or H.

In some embodiments, the permanent magnet 110 may be physically removed from the area of the media to thereby remove the magnetic field generated by the magnet from the media. In some embodiments, the permanent magnet 110 may be replaced by an electromagnet, or a superconducting magnet, which can be coupled to, and controlled by, the processor 114.

In several embodiments, the media 102 is configured for HAMR. In such embodiments, the media 102 can have a stacked structure including a base substrate, an adhesion layer on the substrate, an interlayer and/or a heat sink layer on the adhesion layer, a recording layer (e.g., L10 FePt or other suitably configured materials) on the interlayer/heat sink layer, an overcoat layer on the recording layer, and a lubricant layer on the overcoat layer. In other embodiments, other media structures suitably configured for HAMR can be used. In several embodiments, the beam splitter 108 can be a polarizing beam splitter.

FIG. 2 is a top schematic view of a spin stand 200 having a spindle 201 that can be used in a testing system configured to extract Curie temperature distribution from disks/media configured for heat assisted magnetic recording (HAMR) in accordance with one embodiment of the invention. The spin stand testing system 200 includes a disk 202 and a positioning device 204. The disk 202 is representative of a magnetic recording disk that would be used in a hard disk drive and is configured to rotate around an axis at a variable rotation rate. The testing system 200 also includes the spindle 201 that can control the rotation of the disk 202. The positioning device 204 secures a head gimbal assembly (HGA) 206 that includes a head 208. The HGA 206 also includes a microactuator 209 that is configured to laterally translate a read sensor of the head 208, for instance, by translating the entire head 208 as shown, or by translating just a transducer of the head 208 that includes the read sensor.

The positioning device 204 is configured to position the head 208 to a desired position on the disk 202, for example, with a combination of coarse and fine positioners for translating the HGA 206 to a track 220. As shown in FIG. 1, the positioning device 204 includes both coarse and fine positioners. The coarse positioning of the head 208 is performed by two platforms on orthogonal rail systems, while the fine positioning is performed by a secondary mover 222.

Turning first to the coarse positioners, the HGA 206 is secured to a base 210 on a first platform 212. The first platform 212 includes a set of rails 214 upon which the base 210 can move back and forth in a first direction relative to the first platform 212. A motor (not shown) is one example of a mechanism for driving the base 210 relative to the first platform 212. Similarly, the positioning device 204 also has a second platform 216 including a set of rails 218. In this embodiment the first platform 212 is configured to move upon the rails 218 relative to the second platform 216 in a second direction.

By moving the base 210 relative to the first platform 212, and by moving the first platform 212 relative to the second platform 216, the head 208 can be positioned at a desired disk radius, r, and skew angle, $\alpha$ (an angle formed between a longitudinal axis of the HGA 206 and a tangent to a radial line through the head 208). It will be appreciated, however, that various types of coarse positioning means, and not just that employed by the positioning device 204 to move the base 210 relative to the disk 202, may be used in accordance with embodiments of the invention.

In addition to the orthogonal rail system for coarse positioning, the positioning device 204 also includes the secondary mover 222. The secondary mover 222 provides a finer positioning capability in a lateral direction than is provided by the orthogonal rail system. The secondary mover 222 provides fine positioning, for example, through the use of an actuator based on a piezoelectric material. Preferably, the secondary mover 222 is able to move the head 208 in steps that are on the order of a micro-inch or less.

The positioning device 204 further includes a processor 224 that may be electrically coupled to the head 208, the microactuator 209, the secondary mover 222, and the coarse and fine positioners. The processor 224 can include a memory configured to store information such as instructions to be executed on the processor 224 or other information. In some embodiments, the memory is integrated with processor 224. In other embodiments, the memory is not integrated with processor 224. The processor 224 is configured to execute instructions for operating the spin stand testing system 200.

In this context, the processor 224 or processor 114 of FIG. 1 refers to any machine or selection of logic that is capable of executing a sequence of instructions and should be taken to include, but not limited to, general purpose microprocessors, special purpose microprocessors, central processing units (CPUs), digital signal processors (DSPs), application specific integrated circuits (ASICs), signal processors, microcontrollers, and other suitable circuitry. Further, it should be appreciated that the term processor, microprocessor, circuitry, controller, and other such terms, refer to any type of logic or circuitry capable of executing logic, commands, instructions, software, firmware, functionality, or other such information.

Figure 3:
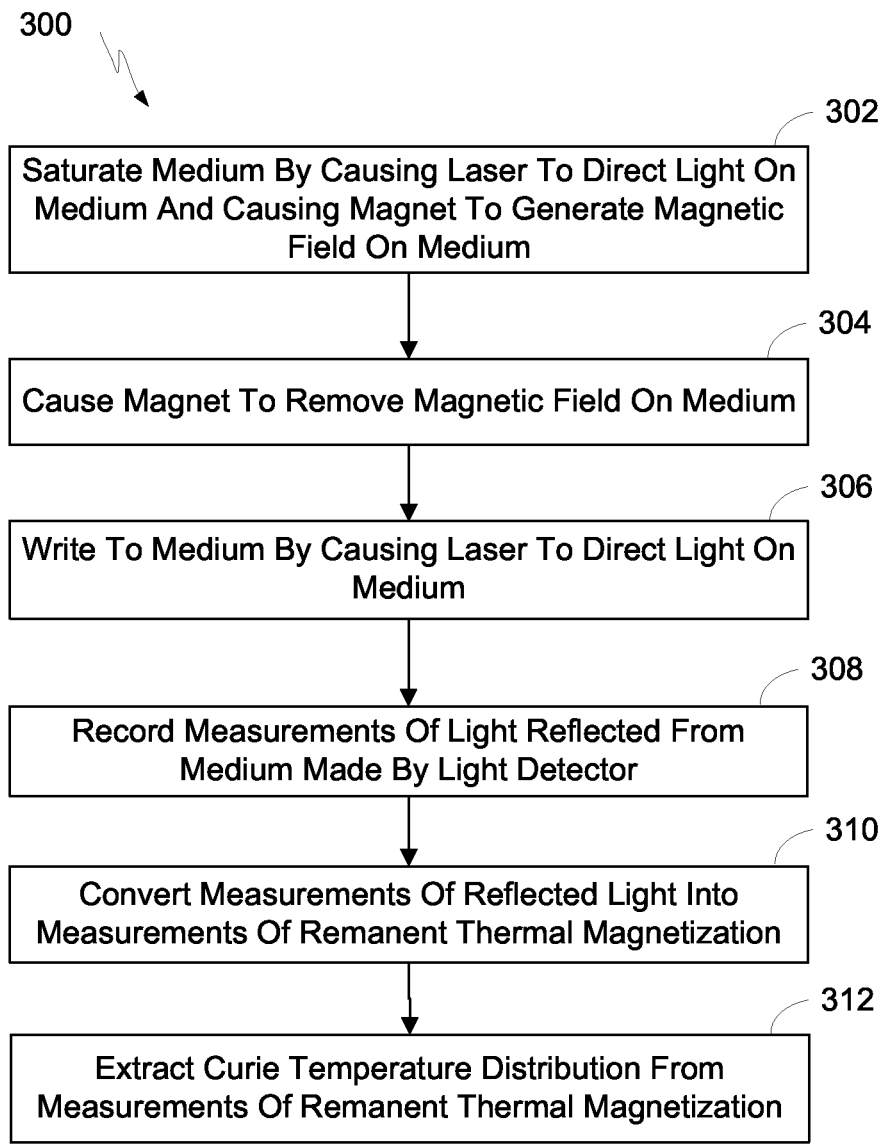
FIG. 3 is a flowchart of a general process for extracting Curie temperature distribution on disks/media configured for heat assisted magnetic recording (HAMR) in accordance with one embodiment of the invention.

FIG. 3 is a general flowchart of a process 300 for extracting Curie temperature (Tc) distribution on disks/media configured for heat assisted magnetic recording (HAMR) in accordance with one embodiment of the invention. In particular embodiments, the process 300 can be used by the processor of FIG. 1, or spin stand control logic of FIG. 2, to extract Tc distribution from magnetic media. In block 302, the process first saturates a medium by causing the laser to direct light on the medium and causing the magnet to generate a magnetic field on the medium. In some embodiments, the application of light on the medium and generation of the magnetic field on the medium are about simultaneous. In other embodiments, they can be sequential.

In block 304, the process causes the magnet to remove the magnetic field on the medium. In some embodiments, the process can move the magnet (e.g., a permanent magnet) away from the medium such that the medium no longer receives the magnetic field. In one such embodiment, a system operator can move the magnet away from the medium. In another embodiment, the process can cause the magnet (e.g., an electromagnet or a superconducting magnet) to remove the magnetic field from the medium by removing an applied voltage applied to the magnet or taking other suitable action.

In block 306, the process writes to the medium by causing the laser to direct light on the medium. In block 308, the process records measurements of light reflected from the medium made by the light detector. In several embodiments, the reflected light may be redirected by a polarizing beam splitter such as component 208 in FIG. 2.

In block 310, the process converts the measurements of reflected light into measurements of remanent thermal magnetization. In block 312, the process extracts the Curie temperature distribution from the measurements of remanent thermal magnetization.

In several embodiments, the measurement is performed by a light/optical detector such as the detector 112 of FIG. 1. In some embodiments, the process can repeat the actions of blocks 302 to 308 until the media is thermally demagnetized. In several embodiments, the process determines a temperature of the media based on a laser power of the laser applied to the media. In several embodiments, the measurement is achieved using a light detector and the process extrapolates the light measurements to compute a corresponding degree of remanent magnetization in the media.

In several embodiments, the results of the process include a determination of a Tc distribution of the media. In one such case, the resulting Tc distribution can be used to modify media manufacturing processes to fine tune the performance of various types of media and/or specific recording layers within the media.

In several embodiments, the process can begin in an initialization mode, including blocks 302 and 304 for example, and later switch to a measurement mode, including blocks 306 and 308 for example.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 4:
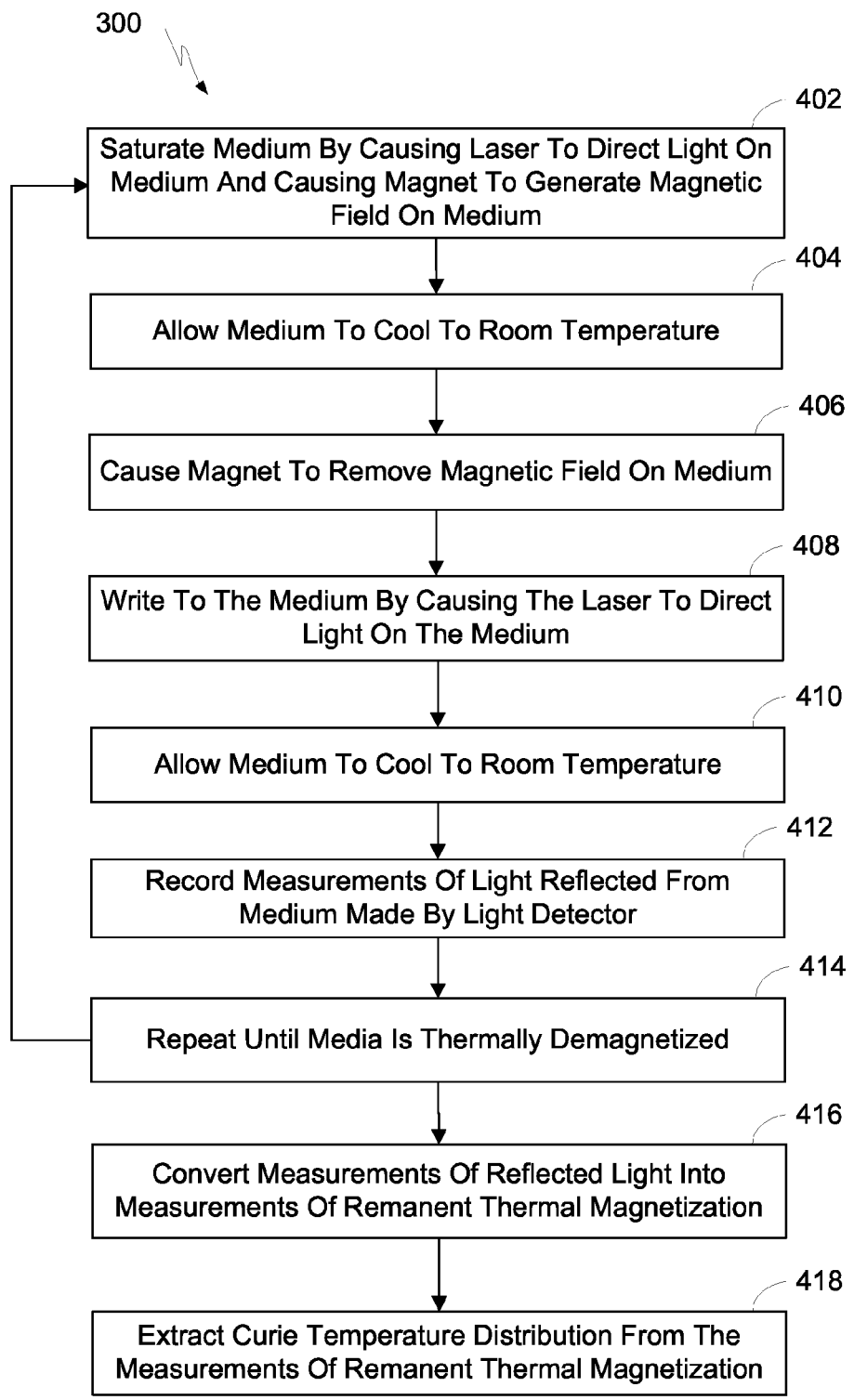
FIG. 4 is a flowchart of a detailed process for extracting Curie temperature distribution on disks/media configured for heat assisted magnetic recording (HAMR) in accordance with one embodiment of the invention.

FIG. 4 is a detailed flowchart of a process 400 for extracting Curie temperature (Tc) distribution on disks/media configured for heat assisted magnetic recording (HAMR) in accordance with one embodiment of the invention. In particular embodiments, the process 400 can be used by the processor of FIG. 1, or spin stand control logic of FIG. 2, to extract Tc distribution from media. As compared to the process of FIG. 3, the process 400 of FIG. 4 can include additional cooling actions and the repetition of certain process actions to ensure that the media is completely thermally demagnetized.

In block 402, the process first saturates a medium by causing the laser to direct light on the medium and causing the magnet to generate a magnetic field on the medium. In some embodiments, the application of light on the medium and generation of the magnetic field on the medium are about simultaneous. In other embodiments, they can be sequential. In block 404, the process allows the medium to cool to a temperature that is about the room temperature.

In block 406, the process causes the magnet to remove the magnetic field from the medium. In block 408, the process writes to the medium by causing the laser to direct light on the medium. In block 410, the process allows the medium to cool to a temperature that is about the room temperature. In block 412, the process records measurements of light reflected from the medium made by the light detector. In several embodiments, the reflected light may be redirected by a polarizing beam splitter such as component 108 in FIG. 1 to a light detector.

In block 414, the process repeats the actions of blocks 402, 404, and 406 (collectively referred to as initialization) and blocks 408, 410 and 412 (collectively referred to as measurement) until the media is completely thermally demagnetized (e.g., once the magnetization corresponding to the measured light returns to an amplitude of about 0).

In block 416, the process converts the measurements of reflected light into measurements of remanent thermal magnetization. In several embodiments, a characteristic of the reflected light includes a degree of rotated polarization (e.g., based on perpendicular magneto-optic (MO) Kerr effect) that can be correlated with the remanent thermal magnetization. The correlation can be performed using various techniques that are well known in the art. In block 418, the process extracts the Curie temperature distribution from the measurements of remanent thermal magnetization. In several embodiments, the process extracts the Curie temperature distribution by generating curves for normalized remanent moment using preselected values of $\sigma Hk$ and $\sigma Tc$ and then choosing the best fitting curve(s) to the data corresponding to the measurements of remanent thermal magnetization. Based on the best fit for the data, both the $\sigma Hk$ and $\sigma Tc$ can thus be obtained from the measurements of remanent thermal magnetization.

In one embodiment, the process can perform the sequence of actions in a different order. In another embodiment, the process can skip one or more of the actions. In other embodiments, one or more of the actions are performed simultaneously. In some embodiments, additional actions can be performed.

Figure 5:
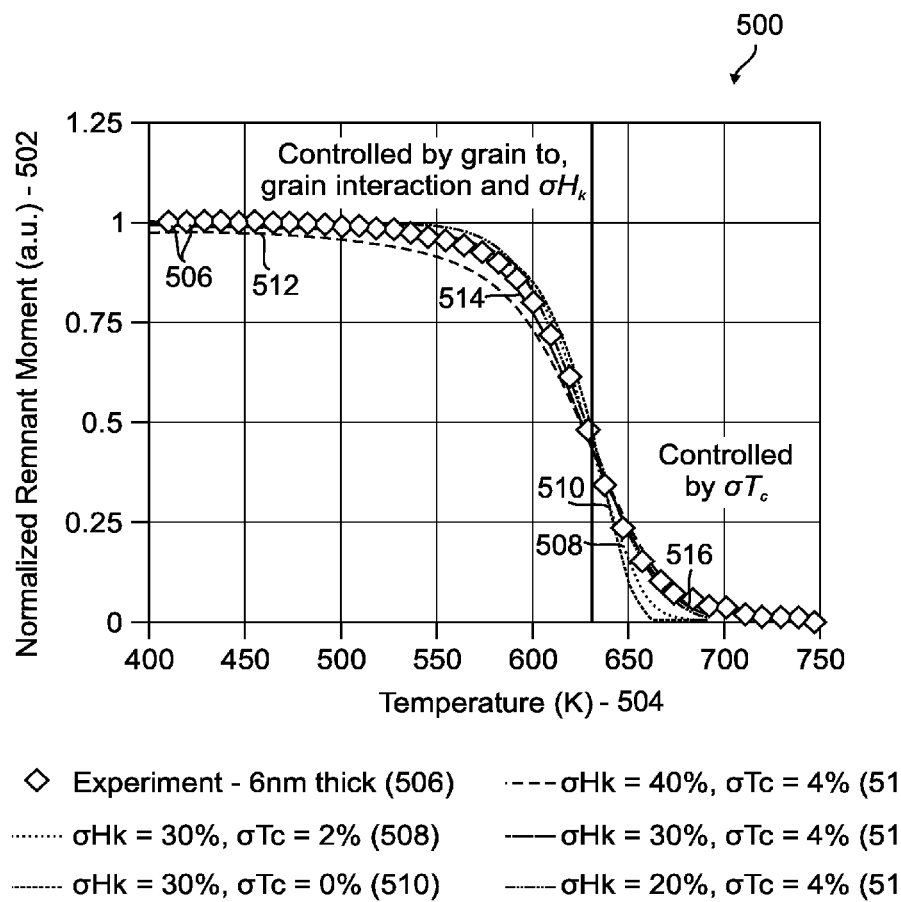
FIG. 5 is a graph of normalized remanent magnetic moment versus temperature for data obtained from a testing system configured to extract Curie temperature distribution in accordance with one embodiment of the invention.

FIG. 5 is a graph of normalized remanent magnetic moment 502 (vertical axis) versus temperature 504 (horizontal axis) for data obtained from a testing system configured to extract Curie temperature distribution in accordance with one embodiment of the invention. The graph illustrates that the tail of normalized remanent magnetic moment or thermal erasure curves (high temperatures) are sensitive to Tc distribution (which makes sense since the Tc is about 690 K), while the upper part (low temperatures) is sensitive to Hk (e.g., magnetic field) distribution (at fixed Tc distribution).

The data points corresponding to reflected light 506 are depicted as diamonds. Curves (508, 510, 512, 514, 516), which correspond to various configurations of magnetic field or Hk distributions and Curie temperature distributions, are fitted to the data points 506. As can be seen in FIG. 5, curves 514 and 516 appear to fit the data points best, particularly at the higher temperature ranges. In several embodiments, the data points can be effectively split in the middle (see for example the vertical line at about 635 K) to ensure the closest fits for the σHk and σTc curves. While the middle line can be used primarily for illustration, it effectively separates two sets of data greatly influenced by different factors, such as either σHk or σTc. In some embodiments, the σHk and σTc curves can be generated using suitable software for modeling mathematics (e.g., MATLAB). In one such embodiment, the curves can be generated using a model involving a Stoner-Wohlfarth non-interacting particle with Arrhenius-Neel type thermal fluctuations. In such case, the input parameters can include saturated magnetization (Ms) and anisotropy field (Hk) as a function of temperature (T), Hk distribution, demagnetization factor, grain size with distribution, and/or Curie temperature (Tc) with distribution. In the curve fittings depicted in FIG. 5, only Hk and Tc distributions were varied, while the rest of parameters were fixed to experimental values reflecting the best available knowledge of the parameters at the time of the test. In several embodiments, the extraction of the Curie temperature distribution from the measurements of remanent thermal magnetization is effectively be achieved by fitting a curve to a set of a data points reflecting the measurements of remanent thermal magnetization.

FIGS. 6a, 6b, 6c are graphs (600, 602, 604) of normalized remanent magnetic moment (vertical axis) versus temperature (horizontal axis) for data obtained from a testing system configured to extract Curie temperature distribution with multiple curves fitted to the data in accordance with one embodiment of the invention. The data points corresponding to reflected light 606 are depicted as diamonds. Graph 600 shows a first curve fit with about 30 percent σHk (Hk distribution) and a second curve fit with about 40 percent σHk, where σTc is about equal to zero for both curves. However, at the tail portion of the data 606 (e.g., temperatures above 650 K) the fit is relatively poor.

Graph 602 shows a first curve fit with about 30 percent σHk and a second curve fit with about 40 percent σHk, where σTc is about equal to 2 percent for both curves. However, at the tail portion of the data 606 (e.g., temperatures above 650 K) for graph 602, the curves only somewhat fit the data 606, though somewhat better than the curves of graph 600.

Graph 604 shows a first curve fit with 30 percent σHk, a second curve fit with 35 percent σHk, and a third curve fit with 40 percent σHk, where σTc is about equal to 4 percent for all three curves. At the tail portion of the data 606 (e.g., temperatures above 650 K) in graph 604, the curves are well fit to the data, particularly the second curve fit with 35 percent σHk.

In these graphs 600, 602, and 604, it can generally be seen that the high temperature "tail" is substantially controlled by σTc, while lower temperature part is substantially controlled by σHk. In addition, one can separately fit for σTc, and σHk. In several embodiments, the curves of FIGS. 6a, 6b, and 6c can be referred to as thermal erasure curves.

It shall be appreciated by those skilled in the art in view of the present disclosure that although various exemplary fabrication methods are discussed herein with reference to magnetic recording disks, the methods, with or without some modifications, may be used for fabricating other types of recording disks, for example, optical recording disks such as a compact disc (CD) and a digital-versatile-disk (DVD), or magneto-optical recording disks, or ferroelectric data storage devices.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A system for extracting a Curie temperature distribution in a heat assisted magnetic recording medium, the system comprising:
    a magnetic recording medium;
    a spindle configured to rotate the medium;
    a magnet adjacent to the medium and configured to generate a magnetic field;
    a laser configured to direct light on the medium;
    a light detector configured to detect light reflected from the medium; and
    a processor coupled to the spindle, the magnet, the laser, and the light detector, the processor configured to:
        saturate the medium by causing the laser to direct light on the medium and causing the magnet to generate a magnetic field on the medium;
        cause the magnet to remove the magnetic field on the medium;
        write to the medium by causing the laser to direct light on the medium;
        record measurements of light reflected from the medium made by the light detector;
        convert the measurements of reflected light into measurements of remanent thermal magnetization; and
        extract the Curie temperature distribution from the measurements of remanent thermal magnetization.

2. The system of claim 1, wherein the processor is further configured to allow the medium to cool to about room temperature before causing the magnet to remove the magnetic field.

3. The system of claim 1, wherein the processor is further configured to allow the medium to cool to about room temperature before recording measurements of light reflected from the medium.

4. The system of claim 1, wherein the processor is further configured to repeat:
   the saturating the medium;
   the causing the magnet to remove the magnetic field;
   the writing to the medium; and
   the recording measurements of light reflected from the medium, until the medium is about thermally de-magnetized.

5. The system of claim 1, further comprising a polarizing beam splitter positioned between the laser and the medium and configured to:
   transmit a portion of the light directed from the laser to the medium; and
   reflect the reflected light from the medium to the light detector.

6. The system of claim 1, wherein the light detector is configured to detect light reflected from the medium using the magneto-optic Kerr effect.

7. The system of claim 1, wherein the processor is configured to extract the Curie temperature distribution from the measurements of remanent thermal magnetization by fitting a curve to a set of a data points reflecting the measurements of remanent thermal magnetization.

8. The system of claim 1, wherein the processor is further configured to saturate the medium by causing the laser to direct light on the medium and causing the magnet to generate the magnetic field on the medium at about the same time.

9. A method for extracting a Curie temperature distribution in a heat assisted magnetic recording medium, the method comprising:
   saturating a magnetic recording medium by causing a laser to direct light on the medium and causing a magnet adjacent to the medium to generate a magnetic field on the medium;
   causing the magnet to remove the magnetic field on the medium;
   writing to the medium by causing the laser to direct light on the medium;
   recording measurements of light reflected from the medium made by a light detector;
   converting the measurements of reflected light into measurements of remanent thermal magnetization; and
   extracting the Curie temperature distribution from the measurements of remanent thermal magnetization.

10. The method of claim 9, further comprising:
    allowing the medium to cool to about a room temperature before the causing the magnet to remove the magnetic field.

11. The method of claim 9, further comprising:
    allowing the medium to cool to about a room temperature before the recording measurements of light reflected from the medium.

12. The method of claim 9, further comprising:
    repeating:
       the saturating the magnetic recording medium;
       the causing the magnet to remove the magnetic field;
       the writing to the medium; and
       the recording measurements of light reflected from the medium, until the medium is about thermally de-magnetized.

13. The method of claim 9, further comprising:
    transmitting, using a polarizing beam splitter positioned between the laser and the medium, a portion of the light directed from the laser to the medium; and
    reflecting the reflected light from the medium to the light detector.

14. The method of claim 9, wherein the light detector is configured to detect light reflected from the medium using the magneto-optic Kerr effect.

15. The method of claim 9, wherein the extracting the Curie temperature distribution from the measurements of remanent thermal magnetization comprises fitting a curve to a set of data points reflecting the measurements of remanent thermal magnetization.

16. The method of claim 9, wherein the saturating the medium by causing the laser to direct light on the medium and causing the magnet adjacent to the medium to generate the magnetic field on the medium is performed at about the same time.

\* \* \* \* \*